United States Patent
Aoyama et al.

(10) Patent No.: US 9,866,256 B2
(45) Date of Patent: Jan. 9, 2018

(54) ELECTRONIC APPARATUS

(71) Applicant: PANASONIC INTELLECTUAL PROPERTY MANAGEMENT CO., LTD., Osaka (JP)

(72) Inventors: Shinya Aoyama, Kanagawa (JP); Takeyuki Sasaki, Kanagawa (JP); Tatsuya Higashii, Kanagawa Ken (JP); Hidehiko Amaki, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/341,981

(22) Filed: Nov. 2, 2016

(65) Prior Publication Data
US 2017/0179993 A1 Jun. 22, 2017

(30) Foreign Application Priority Data

Dec. 21, 2015 (JP) .................................. 2015-248949
Dec. 21, 2015 (JP) .................................. 2015-248950

(51) Int. Cl.
*H04M 1/00* (2006.01)
*H04B 1/38* (2015.01)
(Continued)

(52) U.S. Cl.
CPC ........ *H04B 1/3888* (2013.01); *H04M 1/0202* (2013.01); *H04B 2001/3894* (2013.01); *H04M 2001/0204* (2013.01)

(58) Field of Classification Search
CPC .. H04B 1/3827; H04B 1/3883; H04B 1/3888; H04B 2001/3894; H04M 1/18; H04M 1/0252; H04M 1/0262; H04M 1/0283
(Continued)

(56) References Cited

U.S. PATENT DOCUMENTS 6,844,845 B1 *   1/2005   Whiteside .............. H05K 5/061
                                                        455/347
7,149,558 B2 *  12/2006   Kakuguchi .......... H04B 1/3883
                                                        455/575.8
(Continued)

FOREIGN PATENT DOCUMENTS

JP          09-036941 A      2/1997
JP         2006-340114 A    12/2006
(Continued)

*Primary Examiner* — Quochien B Vuong
(74) *Attorney, Agent, or Firm* — McDermott Will & Emery LLP

(57) ABSTRACT

Electronic apparatus is provided with main body, and inner battery cover and additional module which are attachable and detachable in relation to main body. Battery is stored in opening portion of housing, recessed portion is formed in vertical surface which stands substantially vertically from main surface, and first terminal is formed on inner portion of recessed portion. Connecting surface which comes into contact with vertical surface is formed on additional module, and second terminal which is electrically connected to first terminal is formed on connecting surface. In a state in which additional module is attached to main body, second terminal is positioned on an inner portion of recessed portion and is connected to first terminal, and thus, reliable and firm attachment is performed.

20 Claims, 16 Drawing Sheets

(51) Int. Cl.
*H04B 1/3888* (2015.01)
*H04M 1/02* (2006.01)

(58) Field of Classification Search
USPC .................................. 455/90.3, 557.1, 557.8
See application file for complete search history.

(56) References Cited

U.S. PATENT DOCUMENTS

| | | | |
|---|---|---|---|
| 8,024,015 B2* | 9/2011 | Araki | H04M 1/0262 |
| | | | 455/550.1 |
| 9,331,733 B2* | 5/2016 | Tanaka | H04B 1/3888 |
| 2013/0062837 A1 | 3/2013 | Sasaki | |
| 2014/0057688 A1* | 2/2014 | Shinoda | H04M 1/0262 |
| | | | 455/575.8 |
| 2015/0005042 A1* | 1/2015 | Lee | H04M 1/18 |
| | | | 455/575.8 |

FOREIGN PATENT DOCUMENTS

| | | |
|---|---|---|
| JP | 2012-178317 A | 9/2012 |
| JP | 2014-086980 A | 5/2014 |
| WO | 2012/008311 A1 | 1/2012 |

* cited by examiner

ELECTRONIC APPARATUS

RELATED APPLICATIONS

This application claims the benefit of Japanese Application No. 2015-248949, filed on Dec. 21, 2015 and Japanese Application No. 2015-248950, filed on Dec. 21, 2015, the disclosures of which Applications are incorporated by reference herein.

BACKGROUND

1. Technical Field

The present disclosure relates to an electronic apparatus to which it is possible to add various additional modules according to usage.

2. Description of the Related Art

Adding an additional module to a portable electronic apparatus or the like and obtaining an improvement in functionality is known (refer to Japanese Patent Unexamined Publication No. 9-36941).

Japanese Patent Unexamined Publication No. 9-36941 discloses a portable telephone device in which an additional module is realized which is locked to a portable telephone main body via an additional module locking target portion in a freely attachable and detachable manner and which electrically connects a main body side additional module function connector to an additional module function connector, in which portability is improved in a case in which the additional module is mounted and integrated, and the function of the additional module is added.

SUMMARY

However, in the configuration described in Japanese Patent Unexamined Publication No. 9-36941, the additional module is simply connected to the main body by two guide rails which are the additional module locking target portions, and there are problems in that the additional module is easily dislocated by shock or the like after connected, and consideration is not given to waterproofing.

An object of the disclosure is to provide an electronic apparatus in which the engagement after the mounting of the additional module is strengthened while maintaining ease of attaching and detaching the additional module.

An electronic apparatus of the disclosure includes a main body and an additional module which is capable of being attached and detached in relation to the main body, in which an opening portion which stores a battery is formed in a main surface of the main body, in which a vertical surface which stands substantially vertically from the main surface is formed in a vicinity of the opening portion, a recessed portion is formed in the vertical surface, and a first terminal is formed on an inner portion of the recessed portion, in which a second terminal which connects to the first terminal of the vertical surface is formed on a connecting surface of the additional module, and in which in a state in which the additional module is attached to the main body, the second terminal is positioned in the inner portion of the recessed portion and is connected to the first terminal, and the additional module covers the opening portion in a state in which the battery is stored.

The electronic apparatus of the disclosure is provided with a housing, a battery which is stored in the housing, an inner battery cover which may be attached to the housing and directly covers the battery, and an additional module which may be attached to the housing and covers the inner battery cover in a state in which the inner battery cover covers the battery, in which in a state in which the inner battery cover directly covers the battery and the additional module is attached to the housing, an engaging portion of the additional module engages with both a portion of the housing and a portion of the inner battery cover.

The electronic apparatus of the disclosure is an electronic apparatus which is provided with a housing, a battery which is stored in the housing, and an additional module which may be attached to the housing and covers the battery, in which a portion of the housing is a housing recessed portion which is formed in the housing, in which a portion of a circumferential edge of the battery forms a protruding part which protrudes in an outside direction, in which an engaging protrusion which protrudes in a thickness direction of the additional module is provided on a reverse surface of the additional module, in which in a state in which the battery is stored in a housing, the protruding part is stored in an inner portion of the housing recessed portion, and in which in a state in which the additional module is attached to the housing, the engaging protrusion is engaged in a state of being interposed between a surface of the housing recessed portion and a surface of the protruding part.

The electronic apparatus of the disclosure is provided with a housing, a battery which is stored in the housing, a battery cover which is attached to the housing so as to be possible to open and close and covers the battery in a closed state, in which the battery cover includes two hinge shafts which are engaged with corresponding two guide grooves, which are provided in the housing, to be capable of rotating and moving, and a protrusion-shaped portion which is provided between the two hinge shafts and is in close contact with a portion of the housing in the closed state, and in which the hinge shafts of the battery cover move in an inner portion of the guide grooves while rotating and sliding on walls of the guide grooves in a process of transitioning from the closed state to an open state, and in a process of transitioning from the open state to the closed state.

According to the disclosure, the additional module is electrically connected to the main body by the vertical surface, it becomes possible to restrict the connection location to a predetermined limited area, and it is possible to render the additional module capable of sliding and connecting along the longitudinal direction of the main body. Since the second terminal is positioned in the inner portion of the recessed portion and connects to the first terminal, the shock resistance is strong and the like, and it is possible to firmly attach the additional module to the main body. It is possible to provide an electronic apparatus in which it is possible to easily and reliably install the additional module.

BRIEF DESCRIPTION OF THE DRAWINGS

FIG. 4A is a perspective view of a start time of the attachment, FIG. 4B is a perspective view of a middle time of the attachment, and FIG. 4C is a perspective view of an end time of the attachment;

FIG. 9A is a perspective view of a start time of the attachment, FIG. 9B is a perspective view of a middle time of the attachment, and FIG. 9C is a perspective view of an end time of the attachment;

FIG. 9A, FIG. 10B are sectional diagrams of FIG. 9B, FIG. 10C are sectional diagrams of FIG. 9C, and in each of FIGS. 10A to 10C, (1) is a sectional diagram taken along line A-A, (2) is a sectional diagram taken along line B-B, and (3) is a sectional diagram taken along line C-C;

DETAILED DESCRIPTION

Hereinafter, detailed description will be given of embodiments (hereinafter referred to as "exemplary embodiments") which specifically disclose electronic apparatuses according to the disclosure, with reference to the diagrams, as appropriate. However, description which is more detailed than necessary may be omitted. For example, detailed description of matters which are already well known, and duplicate description of configurations which are effectively the same may be omitted. This is in order to avoid rendering the following description unnecessarily verbose, and to facilitate understanding of a person skilled in the art. The attached diagrams and the following description are provided in order for a person skilled in the art to sufficiently understand the disclosure, and are not intended to limit the described main subject of the claims.

Hereafter, detailed description will be given of favorable exemplary embodiments for carrying out the disclosure with reference to the drawings.

Figure 1:
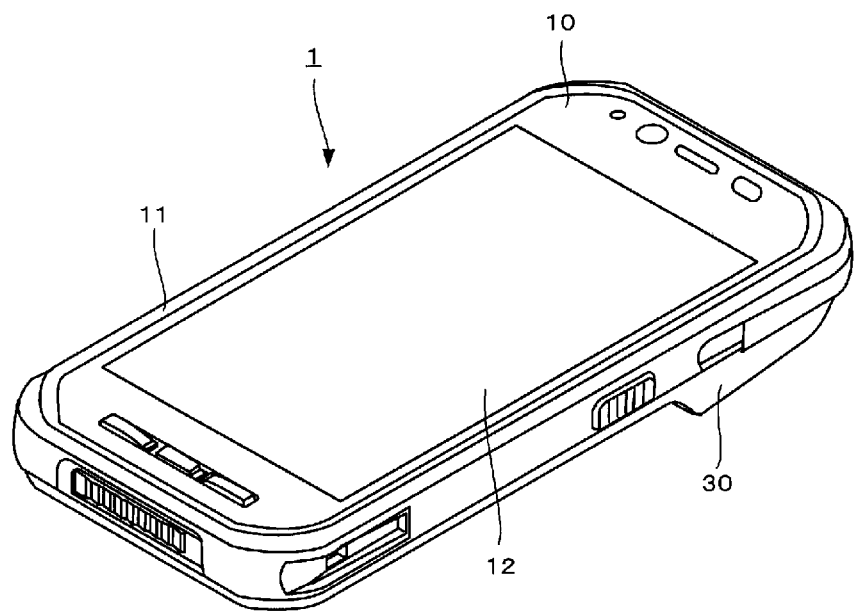
FIG. 1 is a front surface perspective view of an electronic apparatus according to an embodiment of the disclosure.
Figure 2:
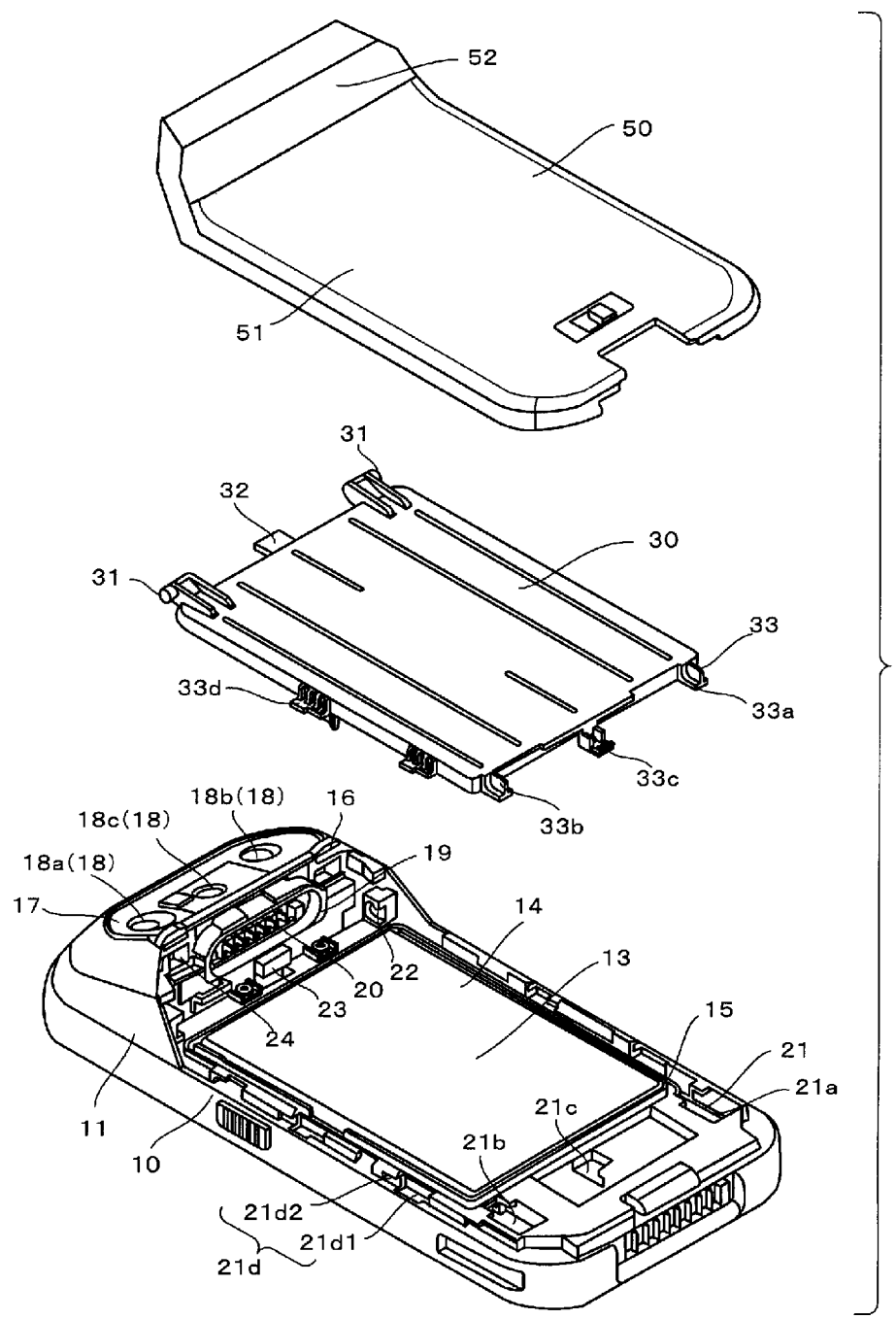
FIG. 2 is a rear surface exploded perspective view of the electronic apparatus according to a first embodiment.
Figure 3:
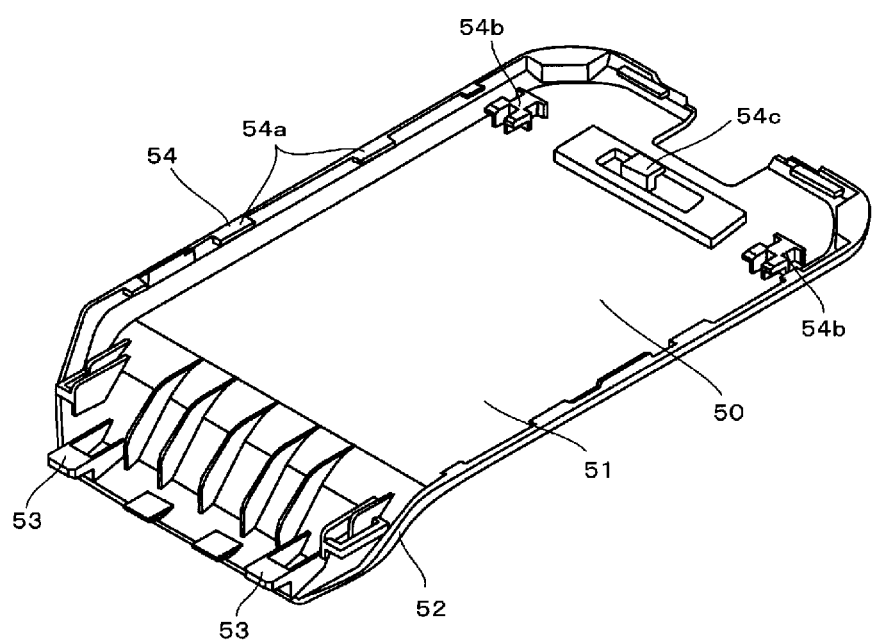
FIG. 3 is a rear surface view of an additional module according to the first embodiment.

FIG. 1 is a front surface perspective view of an electronic apparatus according to an embodiment of the disclosure, FIG. 2 is a rear surface exploded perspective view of the first embodiment, FIG. 3 is a rear surface perspective view of an additional module, and an example of the first embodiment of the electronic apparatus will be described in detail using FIGS. 1 to 3.

Electronic apparatus 1 is a portable telephone such as a smart phone, a portable terminal such as a tablet, a digital camera, a portable personal computer, a wireless device, or the like, for example, includes personal use and business use, and is provided with main body 10, and inner battery cover 30 and additional module 50 which are freely attachable and detachable in relation to main body 10.

Main body 10 is mainly formed of a resin and stores housing 11 which is substantially rectangular prism shaped, display unit 12 which is formed of a display such as a liquid crystal panel or an organic EL panel is stored on the front surface side of housing 11, and battery 13 is stored on the rear surface side of housing 11. A planar surface of the rear surface side of housing 11 is main surface 14, battery 13 is stored in opening portion 15 which is formed in main surface 14, vertical surface 16 which stands substantially vertically from main surface 14 is formed in the vicinity of opening portion 15, and inclined surface 17 which is inclined from a peak portion of vertical surface 16 toward the leading end portion of housing 11 is formed.

Components 18 which have a thickness, for example, camera 18a, flash 18b, bar-code module 18c provided with a bar-code reader, and the like are stored in the space which is formed between vertical surface 16 and inclined surface 17. Recessed portion 19 is formed in vertical surface 16, and first terminal 20 which is a comb-shaped electrode in which individual terminal elements are lined up horizontally is formed in the inner portion of recessed portion 19.

Plurality of housing recessed portions 21 are formed in the circumferential edge of housing 11 on main surface 14 side of housing 11. In the exemplary embodiment, first housing recessed portion 21a and second housing recessed portion 21b, which have substantially the same shape, are formed on the left and right on the end surface side in the longitudinal direction of the housing corresponding to vertical surface 16, and third housing recessed portion 21c, which has a different shape from first and second housing recessed portions 21a and 21b, is formed in approximately the center portion. A plurality of fourth housing recessed portions 21d are formed on both sides of housing 11, and fourth housing recessed portion 21d is provided with depressed portion 21d1, and hollow portion 21d2, the top portion of which is covered by a portion of housing 11.

In housing 11 in the vicinity of vertical surface 16, guide grooves 22 which have substantially arc-shaped cross sections are approximately provided on the left and right side portions, and projecting portion 23 is provided in approximately the center portion. Insertion holes 24 are formed in both sides of recessed portion 19 of vertical surface 16.

Inner battery cover 30 is a substantially rectangular prism shaped battery cover which is attached to be capable of relatively opening and closing in relation to housing 11 and is formed of a resin molded product or the like which directly covers battery 13 in the closed state. A pair of hinge shafts 31, the cross section of which is substantially circular, is provided on both sides of one end of inner battery cover 30. Protrusion-shaped portion 32 is provided between two hinge shafts 31 at approximately the center portion of one end. A plurality of protruding parts 33 are provided to protrude at the other end and the circumferential edges of both sides. First and second protruding parts 33a and 33b, which have a substantially inverted T-shaped cross section, are provided on both sides of the other end, third protruding part 33c, which has a substantially C-shaped cross section, is provided on approximately the center portion of the other end, and a plurality of fourth protruding parts 33*d*, which have a substantially L-shaped cross section, are provided on both sides.

Additional module 50 is capable of being attached to housing 11, covers inner battery cover 30 in a state in which inner battery cover 30 covers battery 13, and is an outer battery cover in the first embodiment. Additional module 50 is formed of a molded product of resin or the like and is substantially rectangular prism shaped, and includes planar surface 51 and standing surface 52 which stands up from planar surface 51. A plurality of insertion parts 53 which protrude forward are formed on the leading end of standing surface 52, and a plurality of engaging portions 54 are formed on the rear surface side. Engaging portion 54 includes a plurality of first engaging protrusions 54*a*, a pair of fork shaped second engaging protrusions 54*b*, and third engaging protrusion 54*c*. The plurality of first engaging protrusions 54*a* protrude from the circumferential edge of additional module 50 in the inside direction of additional module 50, the pair of second engaging protrusions 54*b* protrude from the vicinity of the end surface side in the thickness direction of additional module 50, and third engaging protrusion 54*c* is capable of sliding on a substantially straight line joining the pair of second engaging protrusions 54*b*.

Figure 4A:
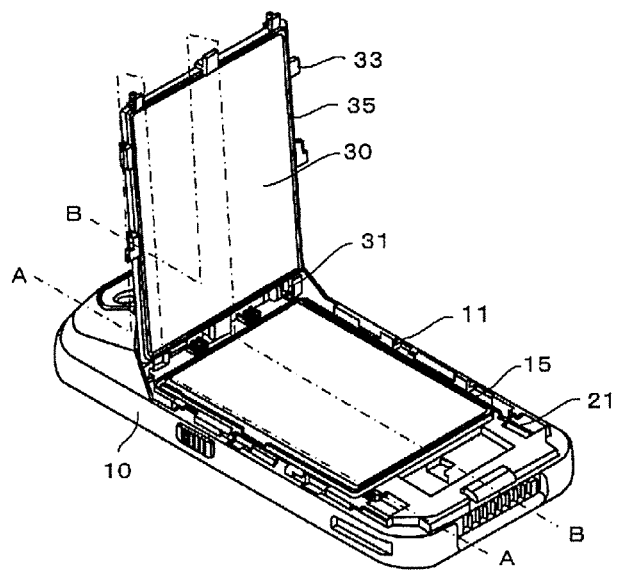
FIGS. 4A to 4C illustrate an attachment procedure of an inner battery cover of the electronic apparatus according to the first embodiment.
Figure 4B:
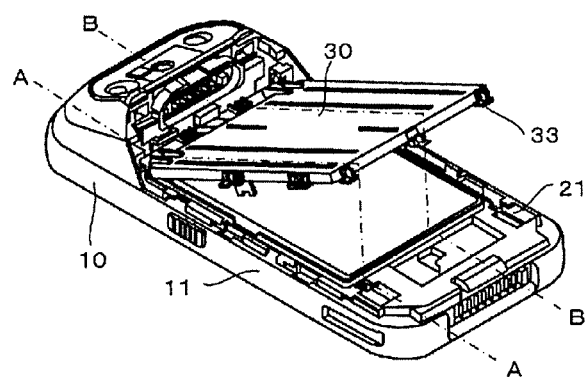
Figure 4C:
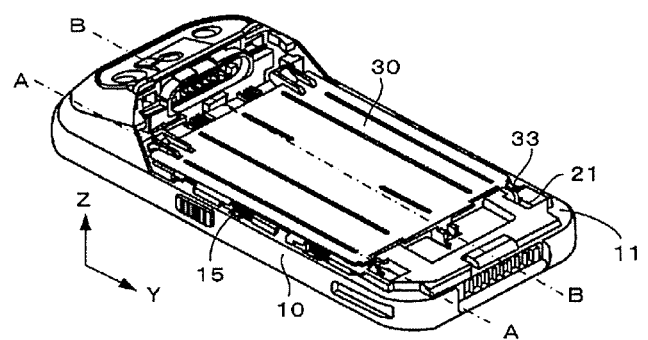

FIGS. 4A to 4C are explanatory diagrams of the attachment procedure of the main body and the inner battery cover, and FIGS. 5A to 8D are sectional diagrams taken along lines A-A and B-B of FIGS. 4A to 4C. Detailed description will be given of the assembly of the inner battery cover using FIGS. 4A to 8D.

Figure 5A:
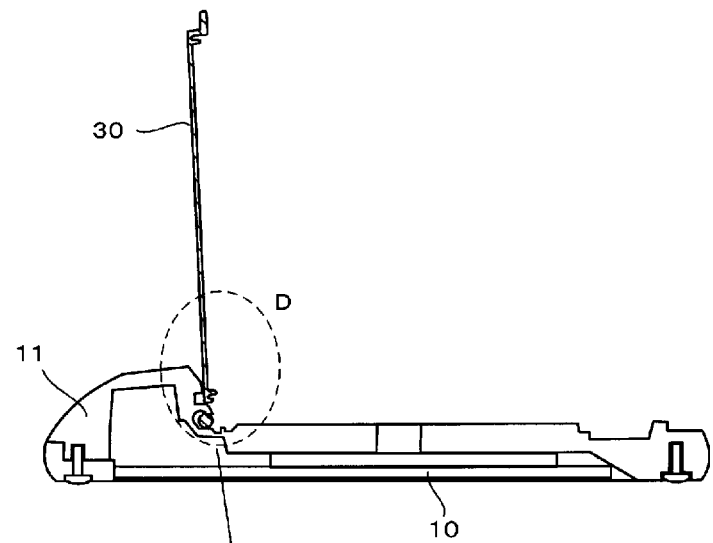
FIG. 5A is a sectional diagram taken along line A-A of FIG. 4A.
Figure 5B:
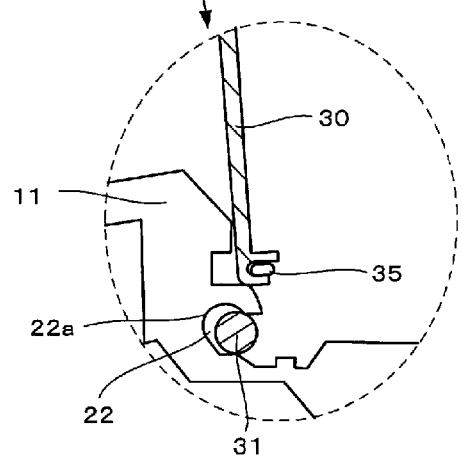
FIG. 5B is an enlarged diagram of the D portion of FIG. 5A.
Figure 6A:
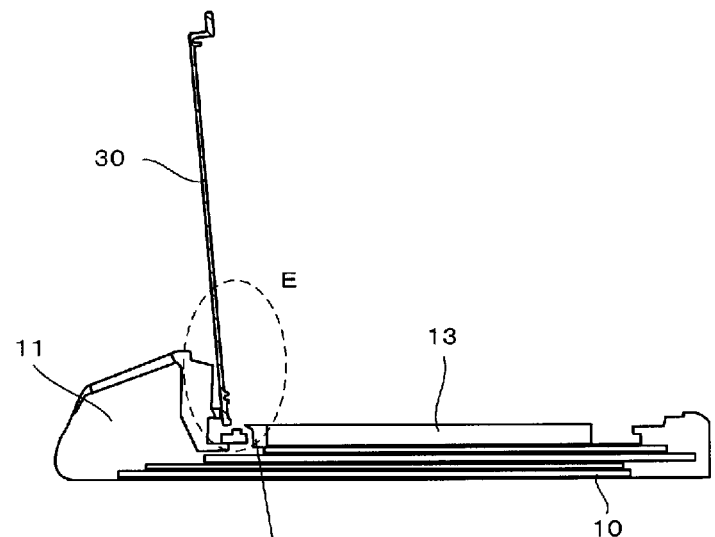
FIG. 6A is a sectional diagram taken along line B-B of FIG. 4A.
Figure 6B:
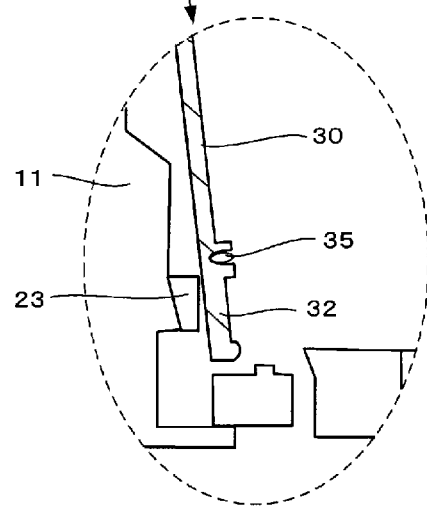
FIG. 6B is an enlarged diagram of the E portion of FIG. 6A.

First, two hinge shafts 31 of inner battery cover 30 are engages with two guide grooves 22 which are provided in housing 11 (refer to FIGS. 4A, 5A, and 5B). At the start time of the assembly, since the circumferential edge of hinge shaft 31 is in a state of being in contact with the vicinity of the opening of wall 22*a* of guide groove 22, inner battery cover 30 stands in the up direction of main body 10 in a state slightly approaching vertical surface 16 side from vertical in relation to main body 10. In the positional relationship in which inner battery cover 30 is in the open state, opening portion 15 of housing 11 assumes a completely open state, and the exchanging of battery 13 becomes easy.

Figure 7A:
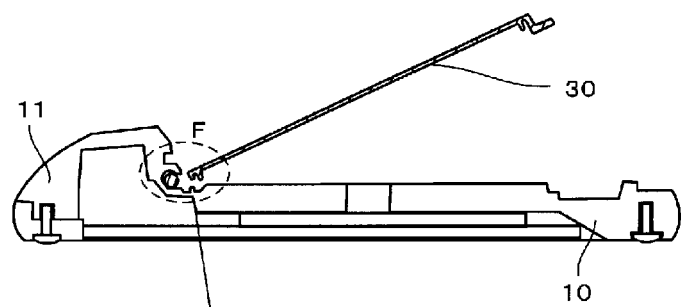
FIG. 7A is a sectional diagram taken along line A-A of FIG. 4B.
Figure 7B:
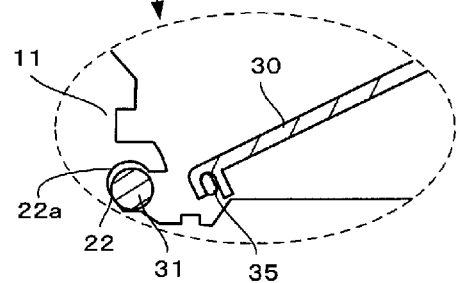
FIG. 7B is an enlarged diagram of the F portion of FIG. 7A.
Figure 7C:
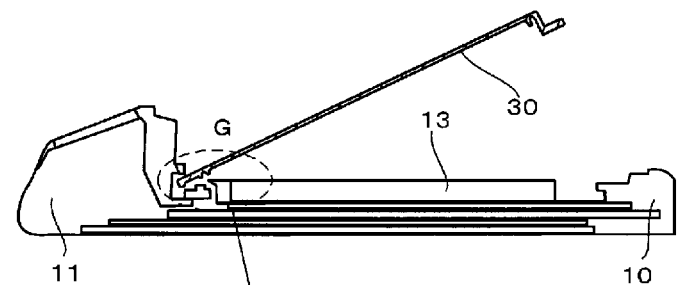
FIG. 7C is a sectional diagram taken along line B-B of FIG. 4B.
Figure 7D:
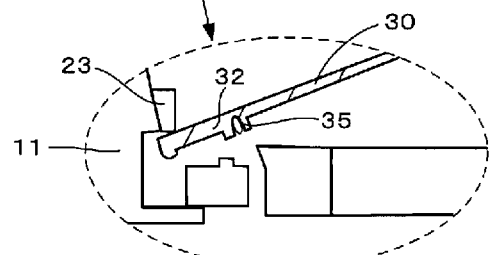
FIG. 7D is an enlarged diagram of the G portion of FIG. 7C.

Next, when the other end side of hinge shaft 31 of inner battery cover 30 is pushed, the circumferential edge of hinge shaft 31 slides on wall 22*a* of guide groove 22 centered on hinge shaft 31, and moves in an internal direction of guide groove 22 (refer to FIGS. 4B, 7A, and 7B). In the attachment process, inner battery cover 30, that is, a surface of projecting portion 32 of inner battery cover 30 comes into contact with a surface of projecting portion 23 of housing 11 (refer to FIGS. 7C and 7D).

Figure 8A:
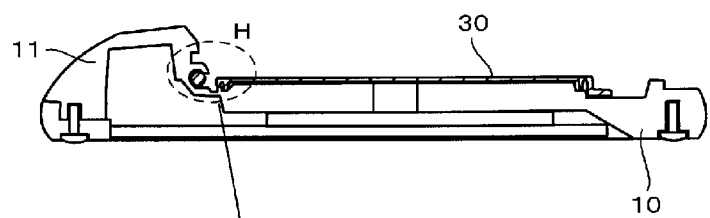
FIG. 8A is a sectional diagram taken along line A-A of FIG. 4C.
Figure 8B:
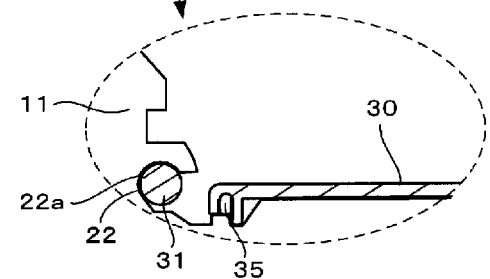
FIG. 8B is an enlarged diagram of the H portion of FIG. 8A.
Figure 8C:
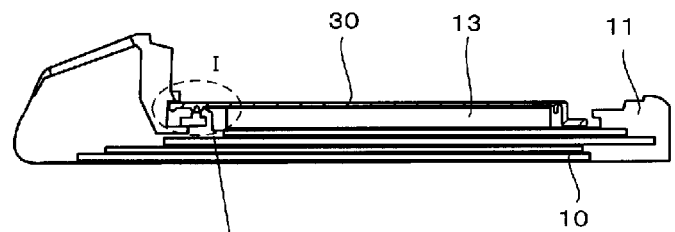
FIG. 8C is a sectional diagram taken along line B-B of FIG. 4C.
Figure 8D:
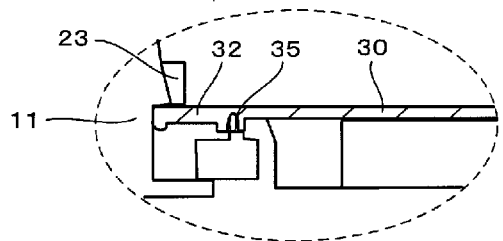
FIG. 8D is an enlarged diagram of the I portion of FIG. 8C.

At the end time of the attachment at which inner battery cover 30 is in the closed state, the circumferential edge of hinge shaft 31 is in circumferential contact with wall 22*a* of guide groove 22, and each protruding part 33 of inner battery cover 30 is stored in the inner portion of each corresponding housing recessed portion 21 of housing 11 (refer to FIGS. 4C, 8A, and 8B). In the state in which inner battery cover 30 is closed, since a surface of projecting portion 32 is in close contact with projecting portion 23, inner battery cover 30 completely covers battery 13, and stops in close contact with opening portion 15 of housing 11 (refer to FIGS. 8C and 8D). In the closed state of inner battery cover 30, the waterproofing of opening portion 15 of housing 11 is achieved through waterproofing member 35 which is provided on a surface which is the circumferential edge of inner battery cover 30 and faces battery 13 side, and is formed of an O-ring shaped gasket.

As described above, in a process in which hinge shaft 31 of inner battery cover 30 transitions from the closed state to the open state, and in the process in which hinge shaft 31 transitions from the open state to the closed state, hinge shaft 31 moves in the inner portion of guide groove 22 while rotating and sliding on wall 22*a* of guide groove 22. By moving in the inner portion of guide groove 22, hinge shaft 31 becomes capable of moving in directions which are perpendicular to the rotational axis direction of hinge shaft 31 while rotating in the process of transitioning from the closed state to the open state, and in the process of transitioning from the open state to the closed state. Specifically, the perpendicular directions are the thickness direction (the Z direction) of housing 11, and the longitudinal direction (the Y direction) of housing 11 (refer to the arrow directions of FIG. 4C).

Since hinge shaft 31 of inner battery cover 30 rotates in the inner portion of guide groove 22 of housing 11, it is not necessary to remove inner battery cover 30 from housing 11 in the exchanging of battery 13. In the rotation of hinge shaft 31, since inner battery cover 30 moves in directions which are perpendicular to the rotational direction of hinge shaft 31, it becomes possible to sufficiently open inner battery cover 30, and it is possible to reduce the number of components to remove to improve usability.

Figure 9A:
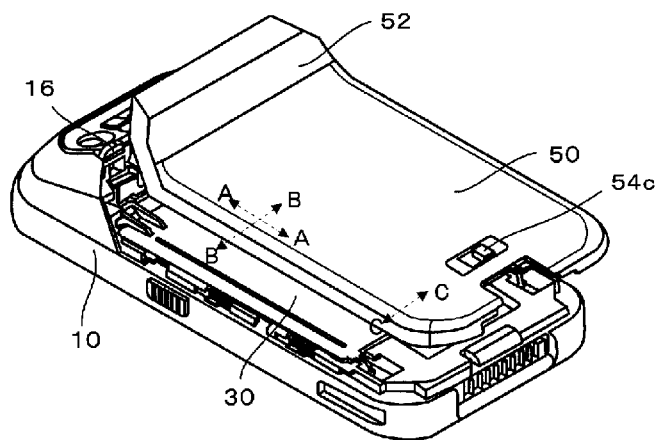
FIGS. 9A to 9C illustrate an attachment procedure of the additional module of the electronic apparatus according to the first embodiment.
Figure 9B:
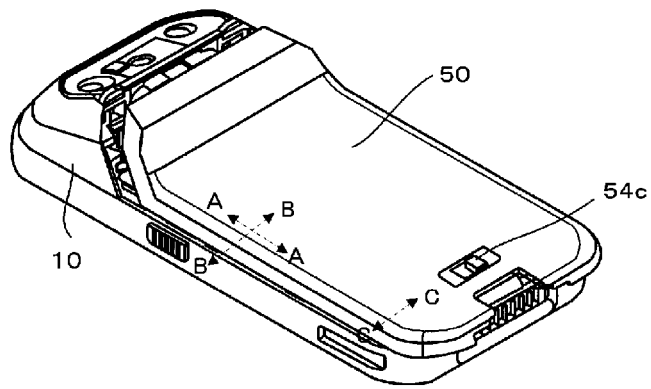
Figure 9C:
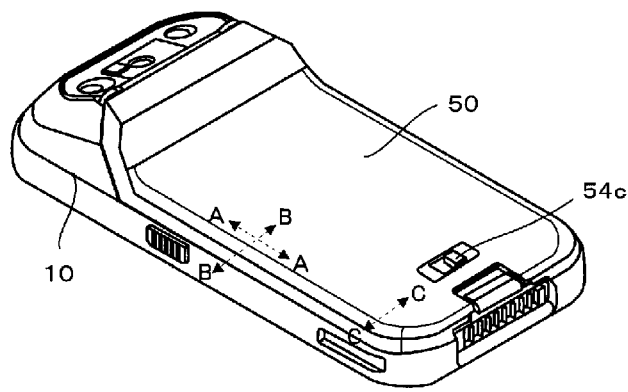
Figure 10A:
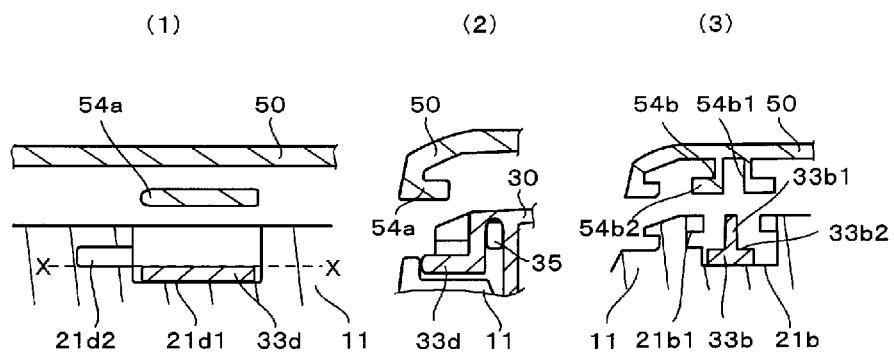
FIG. 10A are sectional diagrams
Figure 10B:
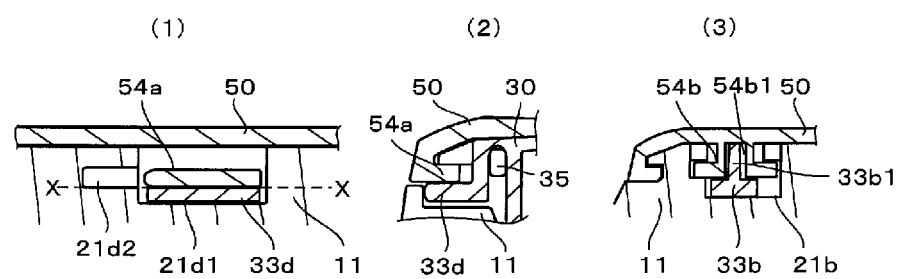
Figure 10C:
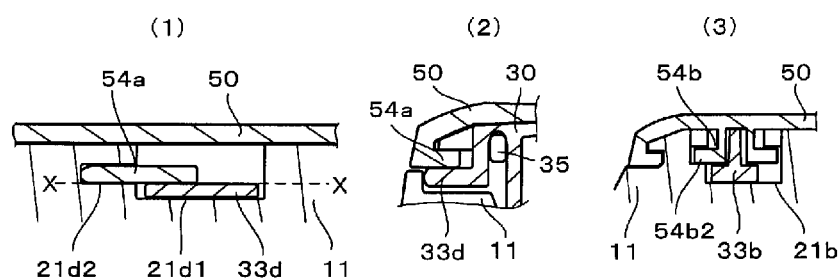

FIGS. 9A to 9C are explanatory diagrams of the attachment procedure of the main body and the additional module, and FIGS. 10A to 10C are sectional diagrams taken along line A-A, line B-B, and line C-C of FIGS. 9A to 9C. Detailed description will be given of the assembly of the additional module using FIGS. 9A to 10C. In particular, description is given of the relationship between housing recessed portion 21 and engaging portion 54 using FIGS. 10A to 10C, and, for example, the relationship between fourth housing recessed portion 21*d* and first engaging protrusion 54*a* is described in the sections taken along line A-A and line B-B, and the relationship between second housing recessed portion 21*b* and second engaging protrusion 54*b* is described in the section taken along line C-C.

Additional module 50 is attached while being slid slightly to the rear in relation to main body 10. Each engaging portion 54 of additional module 50 is positioned on each corresponding housing recessed portion 21 of housing 11 (refer to FIGS. 9A and 10A). In particular, in fourth housing recessed portion 21*d*, fourth protruding part 33*d* of inner battery cover 30 is stored in depressed portion 21*d*1, and in the stored state, continuous surface X-X is formed by the top surface of fourth protruding part 33*d* and the base surface of hollow portion 21*d*2 (refer to (1) of FIG. 10A). In other words, in a state in which inner battery cover 30 covers battery 13, a surface (in particular, the base surface of hollow portion 21*d*2) of housing recessed portion 21 and a surface (in particular, the top surface of fourth protruding part 33*d*) of protruding part 33 are adjacent to each other and form continuous surface X-X. While not illustrated in the drawings, a surface of third housing recessed portion 21*c* and a surface of third protruding part 33*c* are adjacent to each other and form a continuous surface.

Next, each engaging portion 54 of additional module 50 is stored in each corresponding housing recessed portion 21 of housing 11 (refer to FIGS. 9B and 10B). At this time, insertion part 53 of additional module 50 is in a position corresponding to insertion hole 24 of housing 11. In fourth housing recessed portion 21*d*, the bottom surface of first engaging protrusion 54a is in contact with the top surface of fourth protruding part 33d of inner battery cover 30 (refer to (1) and (2) of FIG. 10B). In second housing recessed portion 21b, since a portion of second protruding part 33b of inner battery cover 30 is stored in a protruding state, groove portion 54b1 of second engaging protrusion 54b, which is a forked shape, is disposed on corresponding protruding portion 33b1 (refer to (3) of FIG. 10B). Although not illustrated in the drawings, the bottom surface of third engaging protrusion 54c is in contact with the top surface of third housing recessed portion 21c.

Additional module 50 is caused to slide on opening portion 15 of main body 10 such that standing surface 52 of additional module 50 comes into contact with vertical surface 16 of main body 10 (refer to FIGS. 9C and 10C). At the same time, insertion part 53 of additional module 50 is inserted into insertion hole 24 of housing 11. In fourth housing recessed portion 21d, the bottom surface of first engaging protrusion 54a slides on continuous surface X-X, and the leading end portion of first engaging protrusion 54a is inserted into hollow portion 21d2 (refer to (1) and (2) of FIG. 10C). In second housing recessed portion 21b, second engaging protrusion 54b slides on protruding portion 33b1 of second protruding part 33b, and is stored in second housing recessed portion 21b (refer to (3) of FIG. 10C). In particular, protrusion 54b2 of second engaging protrusion 54b slides between engaging surface 21b1 (refer to (3) of FIG. 10A) which is a surface of second housing recessed portion 21b, and engaging surface 33b2 (refer to (3) of FIG. 10A) which is a surface of second protruding part 33b, and is engaged in a state of being interposed between engaging surface 21b1 and engaging surface 33b2. Although not illustrated in the drawings, by causing third engaging protrusion 54c to slide, a portion of third engaging protrusion 54c is engaged by being inserted into a hollow portion which is provided on an inside surface of third housing recessed portion 21c.

In a state in which additional module 50 is attached to housing 11, since each engaging portion 54 is engaged in a state in which a surface of each housing recessed portion 21 is surrounded by a surface of protruding part 33 of inner battery cover 30, additional module 50 is not easily detached from main body 10 even if a shock is applied by falling of electronic apparatus 1 or the like. Engaging portion 54 (first engaging protrusion 54a and second engaging protrusion 54b) of additional module 50 assumes a state of being engaged with both protruding part 33 which is a portion of inner battery cover 30 which covers battery 13 and housing recessed portion 21 which is a portion of housing 11. In particular, the bottom surface of first engaging protrusion 54a engages with continuous surface X-X which is formed by the base surface of hollow portion 21d2 and the top surface of fourth protruding part 33d. Protruding part 54b2 of second engaging protrusion 54b is engaged in a state of being interposed between engaging surface 21b1 of second housing recessed portion 21b and engaging surface 33b2 of second protruding part 33b. Accordingly, even if the thickness of inner battery cover 30 is not increased or the like, it becomes possible to reliably cover battery 13, waterproofing member 35 which is provided on inner battery cover 30 deforms correctly, and it is possible to strengthen the waterproofing performance. Since the circumferential edge of additional module 50 slides smoothly using a surface of protruding part 33 of inner battery cover 30, it is easy to attach additional module 50.

Figure 11:
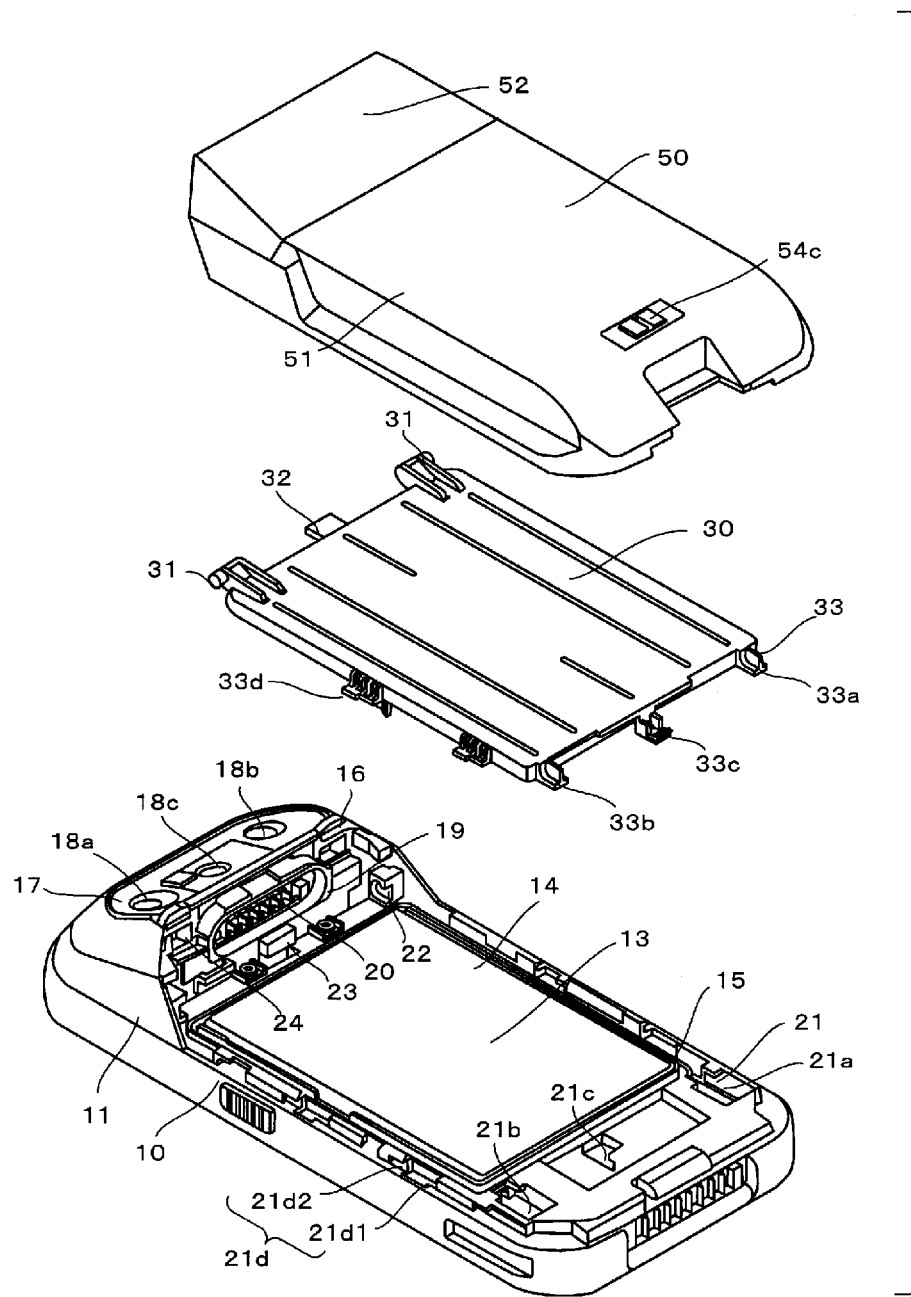
FIG. 11 is a rear surface exploded perspective view of an electronic apparatus according to a second embodiment.
Figure 12:
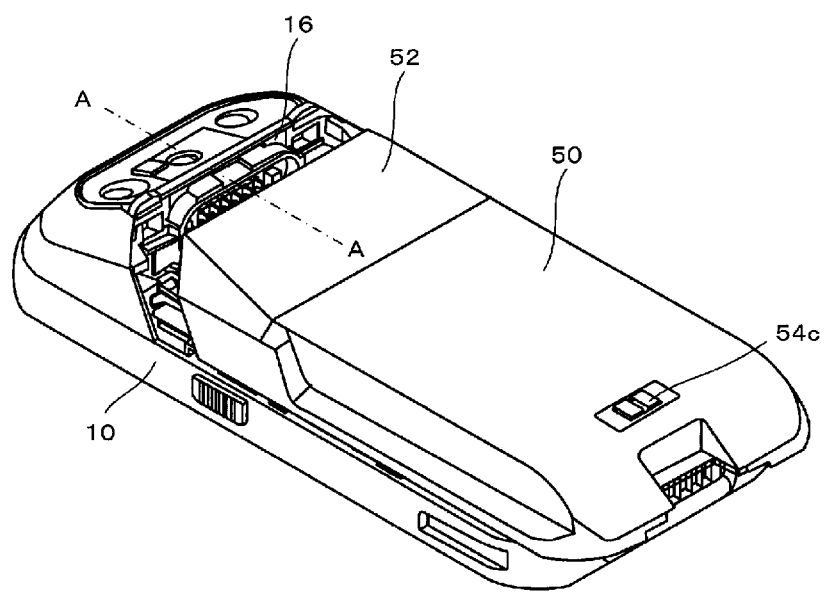
FIG. 12 is a rear surface perspective view of the electronic apparatus according to the second embodiment in the attachment thereof.
Figure 13A:
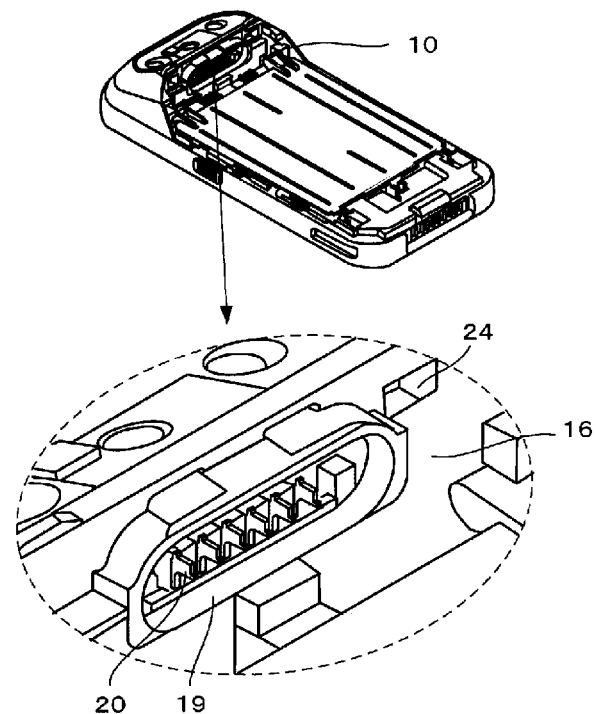
FIG. 13A is an enlarged diagram of a first terminal portion of a main body according to the second embodiment.
Figure 13B:
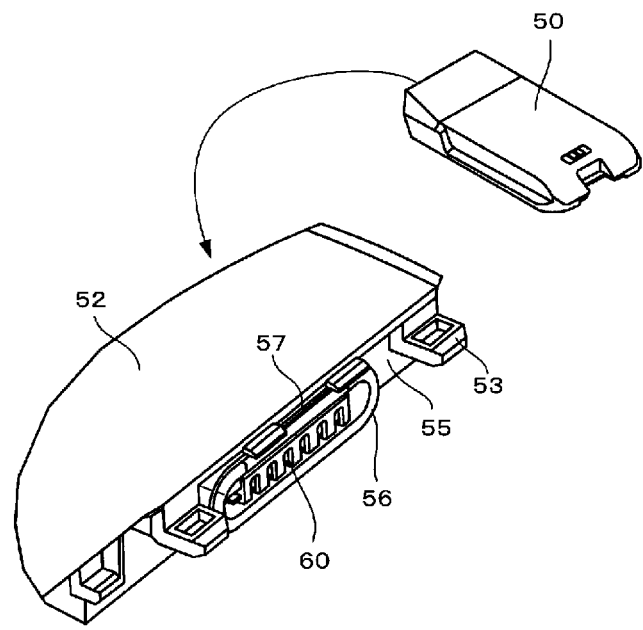
FIG. 13B is an enlarged diagram of a second terminal portion of an additional module according to the second embodiment.
Figure 14:
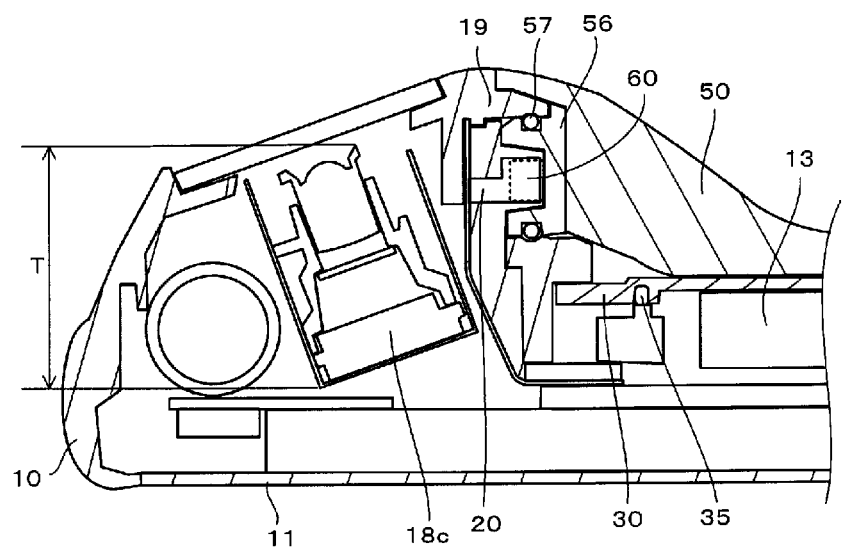
FIG. 14 is a sectional diagram taken along line A-A of FIG. 12.

FIG. 11 is a rear surface exploded perspective view of the second embodiment, FIG. 12 is a perspective view of the attachment of the second embodiment, FIGS. 13A and 13B are enlarged diagrams of a first terminal and a second terminal, and FIG. 14 is a sectional diagram taken along line A-A of FIG. 12. Detailed description will be given of the second embodiment of electronic apparatus 1 using FIGS. 11 to 14.

In the second embodiment, additional module 50 is a module which is attached to main body 10 by removing outer battery cover in the first embodiment. For example, additional module 50 is an additional battery, a radio frequency identification (RFID), a magnetic card reader, an IC card reader, or the like. In the second embodiment, the component which differs from the first embodiment is additional module 50, and since main body 10 and inner battery cover 30 are embodied in the same manner, description thereof will be omitted. Since the attachment of additional module 50 of the second embodiment to main body 10 is essentially the same, description will be given using the same reference signs for the same constituent elements.

Additional module 50 is attached to main body 10 by sliding on opening portion 15 of main body 10 in the same manner as in the first embodiment illustrated in FIG. 12.

Connecting surface 55 which heads downward from standing surface 52 of additional module 50 and comes into contact with vertical surface 16 of main body 10 is formed on additional module 50, and protruding portion 56 which engages with recessed portion 19 of main body 10 is formed on connecting surface 55. Second terminal 60 which is a comb-shaped electrode in which individual terminal elements, which are electrically connected to first terminal 20, are lined up horizontally is formed on protruding portion 56. Waterproofing member 57 which is formed of an O-ring shaped gasket which is capable of deforming is provided on the circumferential edge of protruding portion 56.

As illustrated in FIG. 14, in a state in which additional module 50 is attached to main body 10, second terminal 60 is electrically connected to first terminal 20 and is positioned on the inner portion of recessed portion 19, and waterproofing member 57 is also positioned in the inner portion of recessed portion 19 at the same time. In this state, additional module 50 is reliably attached to main body 10, and even if there is shock caused by the falling of electronic apparatus 1 or the like, additional module 50 is not easily detached from main body 10. It is possible to secure stable waterproofing performance between main body 10 and additional module 50.

According to the above description, exemplary embodiment 1 of the exemplary embodiment includes main body 10 and additional module 50 which is capable of being attached and detached in relation to main body 10, in which opening portion 15 which stores battery 13 is formed in main surface 14 of main body 10, in which vertical surface 16 which stands substantially vertically from main surface 14 is formed in a vicinity of opening portion 15, recessed portion 19 is formed in vertical surface 16, and first terminal 20 is formed on an inner portion of recessed portion 19, in which second terminal 60 which connects to first terminal 20 of vertical surface 16 is formed on connecting surface 55 of additional module 50, and in which in a state in which additional module 50 is attached to main body 10, second terminal 60 is positioned in an inner portion of recessed portion 19 and is connected to first terminal 20, and additional module 50 covers opening portion 15 in a state in which battery 13 is stored.

Accordingly, additional module 50 is electrically connected to main body 10 by vertical surface 16, it becomes possible to restrict the connection location to a predetermined limited area, and it is possible to render additional module 50 capable of sliding and connecting along the longitudinal direction of main body 10. Since second terminal 60 is positioned in the inner portion of recessed portion 19 and connects to first terminal 20, the shock resistance is strong and the like, and it is possible to firmly attach additional module 50 to main body 10. It is possible to provide electronic apparatus 1 in which it is possible to easily and reliably install additional module 50.

Waterproofing member 57 which is capable of deforming may be provided in a periphery of second terminal 60 on connecting surface 55, and in a state in which additional module 50 is attached to main body 10, waterproofing member 57 may be positioned in the inner portion of recessed portion 19. Accordingly, it is possible to strengthen the waterproofing performance between main body 10 and additional module 50.

Waterproofing member 57 may be an O-ring shaped gasket. Accordingly the handling of waterproofing member 57 is facilitated, and the waterproofing performance is improved.

First terminal 20 and second terminal 60 may be comb-shaped electrodes. Accordingly, the electrical connection between first terminal 20 and second terminal 60 is strengthened, and electrical faults caused by vibrations or the like after the connection of additional module 50 are solved.

Thick component 18 may be disposed in an inner portion of vertical surface 16. Here, in FIG. 14, length T indicates the thickness of bar-code module 18c, which is an example of component 18 which is thick in a direction parallel to the thickness direction (the Z direction) of housing 11. Accordingly, it is possible to concentrate thick component 18 which has a predetermined thickness (length T in FIG. 14), in the inner portion of vertical surface 16 of main body 10, to reduce the thickness of the main portions of main body 10, and to support a reduction in the thickness of battery 13.

Electronic apparatus 1 of the exemplary embodiment is provided with housing 11, battery 13 which is stored in housing 11, inner battery cover 30 which may be attached to housing 11 and directly covers battery 13, and additional module 50 which may be attached to housing 11 and covers inner battery cover 30 in a state in which inner battery cover 30 covers battery 13, in which in a state in which inner battery cover 30 directly covers battery 13 and additional module 50 is attached to housing 11, engaging portion 54 of additional module 50 engages with both a portion of housing 11 and a portion of inner battery cover 30.

Accordingly, additional module 50 is engaged with both a portion of housing 11 and a portion of inner battery cover 30, and it becomes possible to easily and reliably fix additional module 50 to main body 10 which includes housing 11 and inner battery cover 30.

Figure 15:
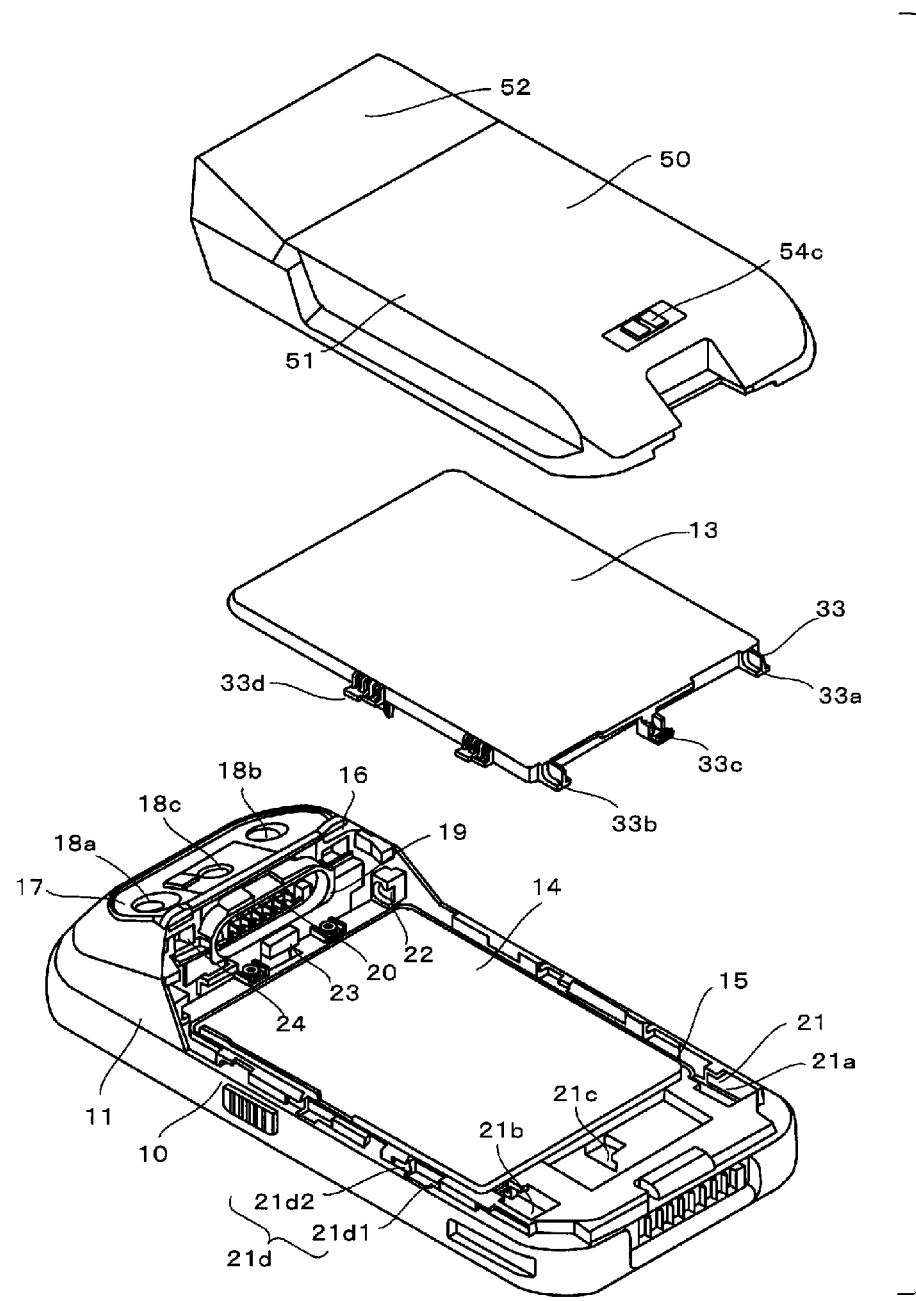
FIG. 15 is a rear surface exploded perspective view of an electronic apparatus according to another embodiment.

In electronic apparatus 1 of the exemplary embodiment, a configuration is adopted in which additional module 50 is engaged with a portion of inner battery cover 30; however, a configuration may be adopted in which the configuration of inner battery cover 30 is omitted, and battery 13 is provided with protruding part 33 as in the other embodiment illustrated in FIG. 15. In other words, in the other embodiment illustrated in FIG. 15, in comparison to the configuration of FIG. 11, inner battery cover 30 is not present. A portion of the circumferential edge of battery 13 forms protruding part 33 which protrudes in the outside direction. In FIG. 15, in the same manner as inner battery cover 30, first protruding part 33a, second protruding part 33b, third protruding part 33c, and fourth protruding part 33d are provided on battery 13. However, it is not necessary to provide all of the protruding parts. For example, in a case in which a portion of the circumferential edge of battery 13 forms third protruding part 33c, in a state in which battery 13 is stored in housing 11, in a state in which third protruding part 33c is stored in the inner portion of third housing recessed portion 21c and additional module 50 is attached to housing 11, third engaging protrusion 54c of the reverse surface of additional module 50 is engaged in a state of being interposed between a surface of third housing recessed portion 21c and a surface of third protruding part 33c. According to this configuration, it is possible to reduce the number of components to produce an equivalent effect.

Additional module 50 may be an outer battery cover. Accordingly, it is possible to protect inner battery cover 30.

Engaging portion 54 may be an engaging protrusion (first engaging protrusion 54a) which protrudes from the circumferential edge of additional module 50 in the inside direction of additional module 50. Accordingly, it becomes possible to easily and reliably fix additional module 50 to main body 10.

The electronic apparatus may be configured such that a portion of housing 11 is housing recessed portion 21 which is formed on a circumferential edge of housing 11, a portion of inner battery cover 30 is protruding part 33 which protrudes from a circumferential edge of inner battery cover 30, in a state in which inner battery cover 30 directly covers battery 13, a surface of housing recessed portion 21 and a surface of protruding part 33 are adjacent to each other and form continuous surface X-X, and in a state in which additional module 50 is attached to housing 11, the engaging protrusion (first engaging protrusion 54a) is engaged with continuous surface X-X.

Accordingly, engaging portion 54 may be an engaging protrusion (second engaging protrusion 54b) which protrudes from additional module 50 in the thickness direction of additional module 50. Accordingly, it becomes possible to easily and reliably fix additional module 50 to continuous surface X-X which is formed by housing recessed portion 21, which is a portion of housing 11, and protruding part 33, which is a portion of inner battery cover 30.

The electronic apparatus may be configured such that a portion of housing 11 is housing recessed portion 21 which is formed in housing 11, a portion of inner battery cover 30 is protruding part 33 which protrudes from a circumferential edge of inner battery cover 30, in a state in which inner battery cover 30 directly covers battery 13, protruding part 33 is stored in an inner portion of housing recessed portion 21, and in a state in which additional module 50 is attached to housing 11, the engaging protrusion (second engaging protrusion 54b) is engaged in a state of being interposed between a surface of housing recessed portion 21 and a surface of protruding part 33. Accordingly, it becomes possible to easily and reliably fix additional module 50 to housing recessed portion 21, which is a portion of housing 11, and protruding part 33, which is a portion of inner battery cover 30.

In the electronic apparatus, waterproofing member 35 may be provided on a surface which is a circumferential edge of inner battery cover 30 and faces battery 13 side. Accordingly, it is possible to improve the waterproofing of electronic apparatus 1.

Electronic apparatus 1 of the exemplary embodiment is provided with housing 11, battery 13 which is stored in housing 11, and additional module 50 which may be attached to housing 11 and covers battery 13, in which a portion of housing 11 is a housing recessed portion (third housing recessed portion 21c) which is formed in housing 11, in which a portion of the circumferential edge of battery 13 forms a protruding part (third protruding part 33c) which protrudes in an outside direction, in which an engaging protrusion (third engaging protrusion 54c) which protrudes in a thickness direction of additional module 50 is provided on the reverse surface of additional module 50, in which in a state in which battery 13 is stored in housing 11, the protruding part (third protruding part 33c) is stored in an inner portion of the housing recessed portion (third housing recessed portion 21c), and in which in a state in which additional module 50 is attached to housing 11, the engaging protrusion (third engaging protrusion 54c) is engaged in a state of being interposed between a surface of the housing recessed portion (third housing recessed portion 21c) and a surface of the protruding part (third protruding part 33c).

Electronic apparatus 1 of the exemplary embodiment is provided with housing 11, battery 13 which is stored in housing 11, a battery cover (inner battery cover 30) which is attached to housing 11 so as to be possible to open and close and covers battery 13 in a closed state, in which the battery cover (inner battery cover 30) includes two hinge shafts 31 which are engaged with corresponding two guide grooves 22, which are provided in housing 11, to be capable of rotating and moving, and protrusion-shaped portion 32 which is provided between two hinge shafts 31 and is in close contact with a portion of housing 11 in the closed state, and in which hinge shafts 31 of the battery cover (inner battery cover 30) move in an inner portion of guide grooves 22 while rotating and sliding on walls of guide grooves 22 in a process of transitioning from the closed state to an open state, and in a process of transitioning from the open state to the closed state.

Accordingly, it becomes possible to sufficiently open inner battery cover 30, and it is possible to reduce the number of components to be removed. Since protrusion-shaped portion 32 is in close contact with a portion of housing 11, it is possible to prevent inner battery cover 30 from lifting up.

A portion of housing 11 may be projecting portion 23 which is in close contact with a surface of protrusion-shaped portion 32 in the closed state. Accordingly, since protrusion-shaped portion 32 is in close contact with projecting portion 23, it is possible to prevent inner battery cover 30 from lifting up.

Hinge shaft 31 of the battery cover (inner battery cover 30) may be configured to move in directions which are perpendicular to the rotational axis direction of hinge shaft 31 in the process of transitioning from the closed state to the open state, and in the process of transitioning from the open state to the closed state. Accordingly, it becomes possible to sufficiently open inner battery cover 30.

The directions which are perpendicular to the rotational axis direction of hinge shaft 31 may include the thickness direction of housing 11, and the longitudinal direction of housing 11. Accordingly, it becomes possible to sufficiently open inner battery cover 30.

Hereunto description is given of an embodiment of an electronic apparatus according to the disclosure with reference to the drawings, and the disclosure is not limited to the examples given. It is clear to a person skilled in the art that various modifications, amendments, replacements, additions, omissions, and equivalences may be made within the scope disclosed in the claims. Naturally, such modifications and the like are understood to fall within the technical scope of the disclosure.

The electronic apparatus of the disclosure is applicable to an electronic apparatus in which attachment of an additional module is easy and reliable, and waterproofing is secured.

What is claimed is:

1. An electronic apparatus comprising:
a main body; and
an additional module which is capable of being attached and detached in relation to the main body,
wherein an opening portion which stores a battery is formed in a main surface of the main body,
wherein a vertical surface which stands substantially vertically from the main surface is formed in a vicinity of the opening portion, a recessed portion is formed in the vertical surface, and a first terminal is formed on an inner portion of the recessed portion,
wherein a second terminal which connects to the first terminal of the vertical surface is formed on a connecting surface of the additional module,
wherein in a state in which the additional module is attached to the main body, the second terminal is positioned in the inner portion of the recessed portion and is connected to the first terminal, and the additional module covers the opening portion in a state in which the battery is stored,
wherein a portion of a circumferential edge of the battery forms a protruding part which protrudes in an outside direction,
wherein an engaging protrusion which protrudes in a thickness direction of the additional module is provided on a reverse surface of the additional module,
wherein in a state in which the battery is stored in a housing, the protruding part is stored in an inner portion of a housing recessed portion, and
wherein in a state in which the additional module is attached to the housing, the engaging protrusion is engaged in a state of being interposed between a surface of the housing recessed portion and a surface of the protruding part.

2. The electronic apparatus of claim 1,
wherein a waterproofing member which is capable of deforming is provided in a periphery of the second terminal on the connecting surface, and
wherein in a state in which the additional module is attached to the main body, the waterproofing member is positioned in the inner portion of the recessed portion.

3. The electronic apparatus of claim 2,
wherein the waterproofing member is an O-ring shaped gasket.

4. The electronic apparatus of claim 2,
wherein the first terminal and the second terminal are comb-shaped electrodes.

5. The electronic apparatus of claim 2,
wherein a thick component is disposed in an inner portion of the vertical surface.

6. The electronic apparatus of claim 1,
wherein the additional module is an outer battery cover.

7. The electronic apparatus of claim 1, further comprising:
an inner battery cover which directly covers the battery,
wherein the additional module covers the inner battery cover in a state in which the inner battery cover is covering the battery, and
wherein in a state in which the inner battery cover directly covers the battery and the additional module is attached to the housing, an engaging portion of the additional module engages with both a portion of the housing and a portion of the inner battery cover.

8. The electronic apparatus of claim 7,
wherein the engaging portion is an engaging protrusion which protrudes from a circumferential edge of the additional module in an inside direction of the additional module.

9. An electronic apparatus comprising:
a main body; and
an additional module which is capable of being attached and detached in relation to the main body,
wherein an opening portion which stores a battery is formed in a main surface of the main body,
wherein a vertical surface which stands substantially vertically from the main surface is formed in a vicinity of the opening portion, a recessed portion is formed in the vertical surface, and a first terminal is formed on an inner portion of the recessed portion,
wherein a second terminal which connects to the first terminal of the vertical surface is formed on a connecting surface of the additional module,
wherein in a state in which the additional module is attached to the main body, the second terminal is positioned in the inner portion of the recessed portion and is connected to the first terminal, and the additional module covers the opening portion in a state in which the battery is stored,
wherein the electronic apparatus further comprises:
an inner battery cover which directly covers the battery,
wherein the additional module covers the inner battery cover in a state in which the inner battery cover is covering the battery,
wherein in a state in which the inner battery cover directly covers the battery and the additional module is attached to a housing, an engaging portion of the additional module engages with both a portion of the housing and a portion of the inner battery cover,
wherein the engaging portion is an engaging protrusion which protrudes from a circumferential edge of the additional module in an inside direction of the additional module,
wherein a portion of the housing is a housing recessed portion which is formed on a circumferential edge of the housing,
wherein a portion of the inner battery cover is a protruding part which protrudes from a circumferential edge of the inner battery cover,
wherein in a state in which the inner battery cover directly covers the battery, a surface of the housing recessed portion and a surface of the protruding part are adjacent to each other and form a continuous surface, and
wherein in a state in which the additional module is attached to the housing, the engaging protrusion is engaged with the continuous surface.

10. The electronic apparatus of claim 9,
wherein a waterproofing member is provided on a surface which is a circumferential edge of the inner battery cover and faces the battery side.

11. The electronic apparatus of claim 9,
wherein the additional module is an outer battery cover.

12. An electronic apparatus comprising:
a main body; and
an additional module which is capable of being attached and detached in relation to the main body,
wherein an opening portion which stores a battery is formed in a main surface of the main body,
wherein a vertical surface which stands substantially vertically from the main surface is formed in a vicinity of the opening portion, a recessed portion is formed in the vertical surface, and a first terminal is formed on an inner portion of the recessed portion,
wherein a second terminal which connects to the first terminal of the vertical surface is formed on a connecting surface of the additional module,
wherein in a state in which the additional module is attached to the main body, the second terminal is positioned in the inner portion of the recessed portion and is connected to the first terminal, and the additional module covers the opening portion in a state in which the battery is stored,
wherein the electronic apparatus further comprises:
an inner battery cover which directly covers the battery,
wherein the additional module covers the inner battery cover in a state in which the inner battery cover is covering the battery,
wherein in a state in which the inner battery cover directly covers the battery and the additional module is attached to a housing, an engaging portion of the additional module engages with both a portion of the housing and a portion of the inner battery cover,
wherein the engaging portion is an engaging protrusion which protrudes from the additional module in a thickness direction of the additional module,
wherein a portion of the housing is a housing recessed portion which is formed in the housing,
wherein a portion of the inner battery cover is a protruding part which protrudes from a circumferential edge of the inner battery cover,
wherein in a state in which the inner battery cover directly covers the battery, the protruding part is stored in an inner portion of the housing recessed portion, and
wherein in a state in which the additional module is attached to the housing, the engaging protrusion is engaged in a state of being interposed between a surface of the housing recessed portion and a surface of the protruding part.

13. The electronic apparatus of claim 12,
wherein a waterproofing member is provided on a surface which is a circumferential edge of the inner battery cover and faces the battery side.

14. The electronic apparatus of claim 12,
wherein the additional module is an outer battery cover.

15. An electronic apparatus comprising:
a main body; and
an additional module which is capable of being attached and detached in relation to the main body,
wherein an opening portion which stores a battery is formed in a main surface of the main body,
wherein a vertical surface which stands substantially vertically from the main surface is formed in a vicinity of the opening portion, a recessed portion is formed in the vertical surface, and a first terminal is formed on an inner portion of the recessed portion,
wherein a second terminal which connects to the first terminal of the vertical surface is formed on a connecting surface of the additional module,
wherein in a state in which the additional module is attached to the main body, the second terminal is positioned in the inner portion of the recessed portion and is connected to the first terminal, and the additional module covers the opening portion in a state in which the battery is stored,
wherein a portion of a circumferential edge of the battery forms a protruding part which protrudes in an outside direction, wherein an engaging portion of the additional module engages with both a portion of a housing and a portion of the battery, wherein the engaging portion is an engaging protrusion which protrudes from a circumferential edge of the additional module in an inside direction of the additional module, wherein a portion of the housing is a housing recessed portion which is formed on a circumferential edge of the housing, wherein in a state in which the battery is stored in the opening portion, a surface of the housing recessed portion and a surface of the protruding part are adjacent to each other and form a continuous surface, and wherein in a state in which the additional module is attached to the housing, the engaging protrusion is engaged with the continuous surface.

16. The electronic apparatus of claim 15,
wherein a waterproofing member which is capable of deforming is provided in a periphery of the second terminal on the connecting surface, and
wherein in a state in which the additional module is attached to the main body, the waterproofing member is positioned in the inner portion of the recessed portion.

17. The electronic apparatus of claim 16,
wherein the waterproofing member is an O-ring shaped gasket.

18. The electronic apparatus of claim 15,
wherein the first terminal and the second terminal are comb-shaped electrodes.

19. The electronic apparatus of claim 15,
wherein a thick component is disposed in an inner portion of the vertical surface.

20. The electronic apparatus of claim 15,
wherein the additional module is an outer battery cover.

* * * * *